Nov. 1, 1932.  G. WOLF  1,885,882
HANGING CHASSIS
Filed Nov. 19, 1931
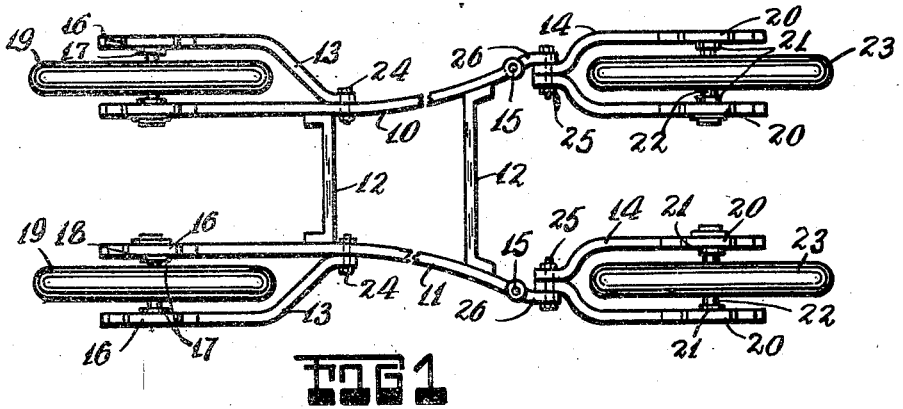
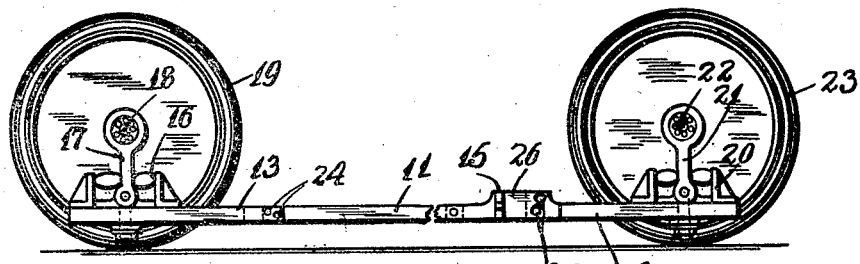
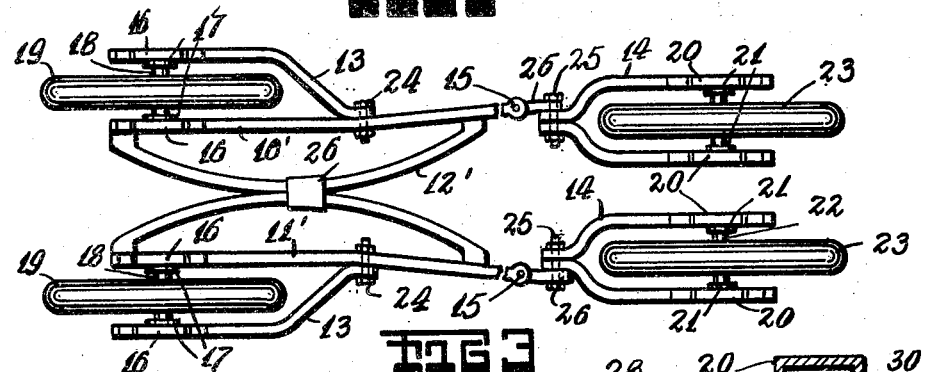
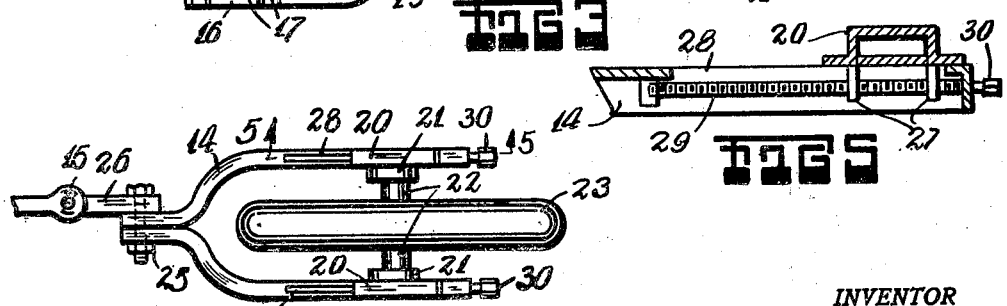
INVENTOR
Gabriel Wolf
BY Zoltan H. Polachek
ATTORNEY Patented Nov. 1, 1932

1,885,882

UNITED STATES PATENT OFFICE

GABRIEL WOLF, OF BRATISLAVA, CZECHOSLOVAKIA

HANGING CHASSIS

Application filed November 19, 1931. Serial No. 576,095.

This invention relates to new and useful improvements in a hanging chassis for motor vehicles.

The invention has for an object the construction of a hanging chassis for motor vehicles which is characterized by fork members removably attached upon the ends of a frame, and links pivotally attached to the fork members and for connection with the axle of the wheels of the vehicle.

As a further object of this invention it is proposed to construct a frame from side-forming members connected by transverse members.

Another one of the objects of this invention is to locate the wheels within the forks and to pivotally support the front forks upon the frame so that the front wheels may be steered.

As a still further object of this invention it is proposed to provide a means for adjusting the position of the kinks from the hinged points of the forks for the purpose of changing the distance of the wheel from the hinged point.

A still further object of this invention is the construction of a device of the class mentioned which is of simple, durable construction, dependable in use and efficient in operation, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of a chassis constructed according to this invention.

Fig. 2 is an elevational view of Fig. 1.

Fig. 3 is a view similar to Fig. 1 but illustrating another form of the invention.

Fig. 4 is a fragmentary detailed view of a portion of the chassis showing a fork constructed according to a modification of this invention.

Fig. 5 is a sectional view taken on the line 5—5 of Fig. 4.

The hanging chassis, according to this invention, comprises a frame which is formed from side-forming members 10 and 11 spaced from each other and rigidly connected by transverse members 12. Front and rear forks are removably attached on the ends of the frame. Bent bars 13 are removably attached upon the rear ends of the side forming members 10 and 11 and together with the ends constitute the rear forks. Front forks 14 are pivotally connected by hinges 15 upon the front ends of the side forming members 10.

Standards 16 are attached upon the rear ends of the side forming members 10 and 11 and the rear ends of the bent members 13. Links 17 pivotally connect with these standards and extend upwards and connect with stud shafts 18 of rear wheels 19. At the front, standards 20 are attached upon the arms of the forks 14. Links 21 pivotally connect with these standards and depend from stud shafts 22 from front wheels 23. Bolts 24 serve to connect the bent members 13 on the side forming members 10 and 11 so that when it becomes necessary to remove the wheels, these bolts may be loosened to separate members forming the forks. At the front, the forks 14 are detachably connected by bolts 25 upon links 26 which connect with the side forming members 10 and 11 by the hinges 15.

In the modified form of the device illustrated in Fig. 3 a frame has been shown which has curved longitudinal members connected with each other by a link 26 and serving to hold the side-forming members 10' and 11' in spaced relation. In other respects this form of the invention is similar to the preferred form previously described.

In Figs. 4 and 5 a modification has been disclosed in which the front forks are provided with means for adjusting the positions of the links 21 for the purpose of changing the distance of the wheel from the hinge 15. The standards 20 have downwards extending lugs 27 which engage through longitudinal slots 28 in the arms of the forks. Screws are rotatively mounted upon the arms of the fork and threadedly engage the lugs 27 so as to cause a change in position of the standards 20 upon rotation of the screws. A change in the standards will cause a change in the location of the links 21. The screws 29 are provided with head 30 which project from the ends of the arms of the fork allowing adjustments.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A hanging chassis for motor vehicles, comprising side-forming members connected with transverse members constituting a frame, forks removably attached upon the front and rear ends of said frame, and links pivotally connected with said forks and for attachment upon the axles of wheels of a vehicle.

2. A hanging chassis for motor vehicles, comprising side-forming members connected with transverse members constituting a frame, forks removably attached upon the front and rear ends of said frame, and links pivotally connected with said forks and for attachment upon the axles of wheels of a vehicle, the front forks being pivotally connected upon the frame to allow steering of the vehicle wheels.

3. A hanging chassis for motor vehicles, comprising side-forming members connected with transverse members constituting a frame, forks removably attached upon the front and rear ends of said frame, and links pivotally connected with said forks and for attachment upon the axles of wheels of a vehicle, standards being attached upon the forks, and said links being pivotally connected with said standards to constitute the pivotal connection between the links and the forks.

4. A hanging chassis for motor vehicles, comprising side-forming members connected with transverse members constituting a frame, forks removably attached upon the front and rear ends of said frame, links pivotally connected with said forks and for attachment upon the axles of wheels of a vehicle, and bolts holding the forks upon said frame and constituting the detachable connection of these parts.

5. A hanging chassis for motor vehicles, comprising a frame, forks removably attached upon the front and rear ends thereof, standards on the front forks and having lugs extending through slots in the forks, screws rotatively mounted on the front forks and threadedly engaging said lugs, and links pivotally connected with said standards and for connection with axles of the wheels of a vehicle.

6. A hanging chassis for motor vehicles, comprising a frame, forks removably attached upon the front and rear ends thereof, standards on the front forks and having lugs extending through slots in the forks, screws rotatively mounted on the front forks and threadedly engaging said lugs, and links pivotally connected with said standards and for connection with axles of the wheels of a vehicle, said screws extending from the forks and having heads at the extending ends.

In testimony whereof I have affixed my signature.

GABRIEL WOLF.